(12) United States Patent
Balasubramanian et al.

(10) Patent No.: US 11,628,556 B2
(45) Date of Patent: Apr. 18, 2023

(54) ROBOTIC SYSTEMS WITH DYNAMIC MOVEMENT CONTROL

(71) Applicant: NextFirst Engineering Technologies Private Limited, Karnataka (IN)

(72) Inventors: Jayendran Balasubramanian, Karnataka (IN); Leon J. Thadamalla, Gujarat (IN)

(73) Assignee: Cartesian Kinetics Inc., Wilmington, DE (US)

( * ) Notice: Subject to any disclaimer, the term of this patent is extended or adjusted under 35 U.S.C. 154(b) by 442 days.

(21) Appl. No.: 17/012,179

(22) Filed: Sep. 4, 2020

(65) Prior Publication Data
US 2022/0016756 A1    Jan. 20, 2022

(30) Foreign Application Priority Data

Jul. 18, 2020 (IN) .............................. 202041030635

(51) Int. Cl.
| | | |
|---|---|---|
| *B25J 5/02* | (2006.01) | |
| *B25J 9/10* | (2006.01) | |
| *B25J 9/16* | (2006.01) | |
| *B25J 13/08* | (2006.01) | |

(52) U.S. Cl.
CPC .............. *B25J 5/02* (2013.01); *B25J 9/1035* (2013.01); *B25J 9/1664* (2013.01); *B25J 9/1679* (2013.01); *B25J 13/08* (2013.01)

(58) Field of Classification Search
CPC . B25J 5/02; B25J 9/1035; B25J 9/1664; B25J 9/1679; B25J 13/08
See application file for complete search history.

(56) References Cited

U.S. PATENT DOCUMENTS

| | | | |
|---|---|---|---|
| 2017/0313514 A1* | 11/2017 | Lert, Jr. ............... | B65G 1/0478 |
| 2020/0324971 A1* | 10/2020 | Ingram-Tedd ....... | B65G 1/1371 |
| 2021/0354919 A1* | 11/2021 | Liu ........................ | G05D 1/021 |

* cited by examiner

*Primary Examiner* — Dale Moyer
(74) *Attorney, Agent, or Firm* — IceMiller LLP

(57) ABSTRACT

A robotic system for dynamic controlling the movement of a mobile robot is presented. The robotic system includes a multi-level transport system arranged in an xyz-space. The multi-level transport system includes a plurality of magnetic tracks configured to allow movement of the mobile robot in at least one direction in the xy-plane. The multi-level transport system further includes a plurality of transfer mechanisms configured to change the direction of the mobile robot in the xy-plane, and to allow the movement of the mobile robot in a direction along the z-axis, each transfer mechanism defining a transfer node in the multi-level transport system. The robotic system further includes a control system configured to dynamically control the movement of the mobile robot in the x,y,z direction at one or more transfer nodes of the multi-level transport system, by dynamically activating a corresponding magnetic track or a corresponding transfer mechanism.

20 Claims, 9 Drawing Sheets

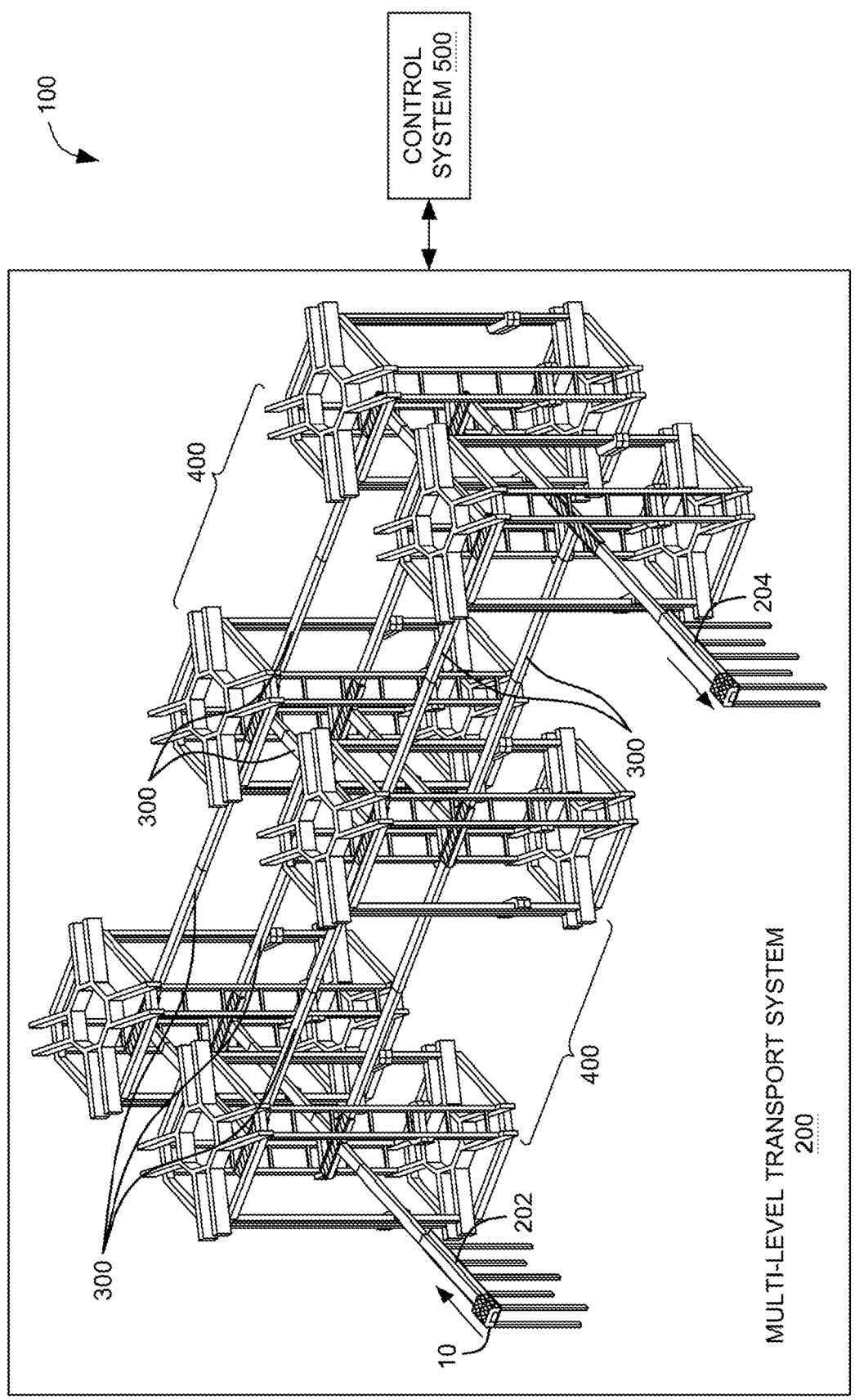
FIG. 1-A

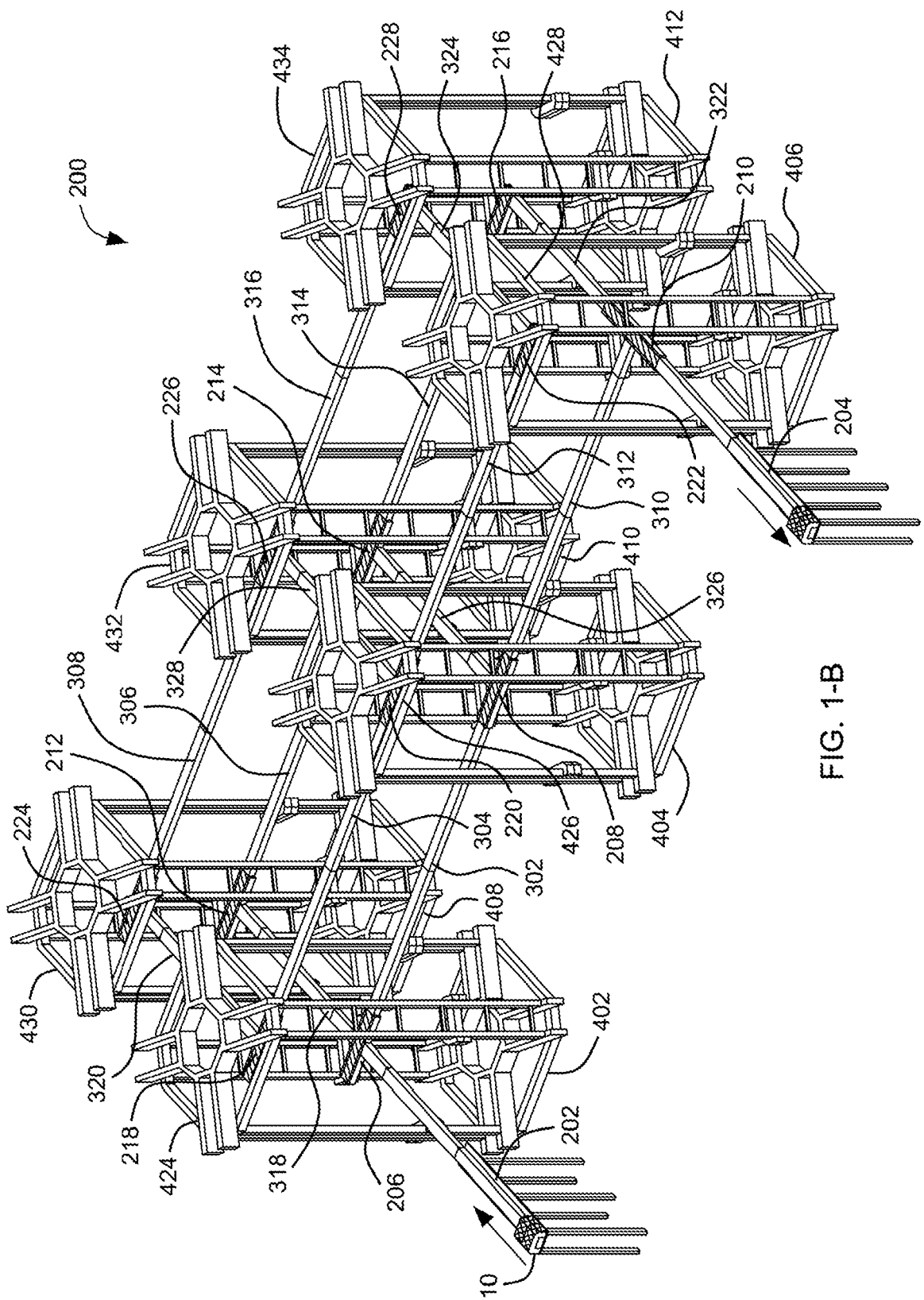
FIG. 1-B

ROBOTIC SYSTEMS WITH DYNAMIC MOVEMENT CONTROL

PRIORITY STATEMENT

The present application hereby claims priority to Indian patent application number 202041030635 filed on Jul. 18, 2020, the entire contents of which are hereby incorporated herein by reference.

BACKGROUND

Embodiments of the description generally relate to a robotic system for dynamically controlling the movement of a mobile robot, and more particularly to an inventory-handling system for dynamically controlling the movement of inventory via a mobile robot in an inventory storage, and delivery system.

There are a variety of automated material handling systems currently used in material storage and delivery environments (such as a warehouse). Non-limiting examples of suitable automated material-handling systems include automated conveyor systems, conveyor systems supplemented with robotics, automated storage and retrieval systems (AS/RS), mobile robotic systems, and the like.

However, the conventional material handling systems may be limited by factors such as footprint, flexibility, and scalability. Conveyor systems have predefined path of material movement. As the predefined path is inherently sequential, the footprint of such systems is inherently large and is potentially determined by availability of varieties of conveyor functions at the time of building the application. While robotic systems may be able to reduce the footprint on an x-y plane with defined boundaries, such systems are not as efficient in utilizing the vertical spaces around its application area particularly density in the vertical z axis. Moreover, conventional material handling-systems are not very flexible in adopting changing business scenarios and resulting changes with respect to business operational flows. Such changes may incur further investments, involve additional cost because of changeover downtime, and also result in wastage of existing infrastructure. Furthermore, these systems are not easily scalable.

The conveyor and robotic-based conventional material handling systems also do not provide individual item handling capability, which is also fast and efficient. Moreover, current material handling systems have mechanical and control limitations that prevents true random access of material from happening, hence reducing speed of access and throughput.

Therefore, there is a need for flexible and scalable robotic systems that are easy to assemble. Moreover, there is a need for robotic system that enable faster access to the material being handled and higher throughputs.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a robotic system for dynamic controlling the movement of a mobile robot is presented. The robotic system includes a multi-level transport system arranged in an xyz-space. The multi-level transport system includes a plurality of magnetic tracks configured to allow movement of the mobile robot in at least one direction in the xy-plane. The multi-level transport system further includes a plurality of transfer mechanisms configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system. A magnetic track of the plurality of magnetic tracks is configured to provide a path for the movement of the mobile robot between two or more transfer mechanisms of the plurality of transfer mechanisms. The robotic system further includes a control system configured to dynamically control the movement of the mobile robot in the x,y,z direction at one or more transfer nodes of the multi-level transport system, by dynamically activating a corresponding magnetic track of the plurality of magnetic tracks or a corresponding transfer mechanism of the plurality of transfer mechanisms.

According to another example embodiment, an inventory-handling system for dynamically controlling the movement of inventory via a mobile robot in an inventory storage and delivery system is presented. The inventory-handling system includes a multi-level transport system arranged in an xyz-space. The multi-level transport system includes a plurality of magnetic tracks configured to allow movement of the mobile robot in at least one direction in the xy-plane. The multi-level transport system further includes a plurality of transfer mechanisms configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system. A track of the plurality of magnetic tracks is configured to provide a path for the movement of the mobile robot between two or more transfer mechanisms of the plurality of transfer mechanisms. The multi-level transport system further includes a plurality of inventory transfer assemblies coupled to a magnetic track of the plurality of magnetic tracks, the plurality of inventory transfer assemblies configured to transfer inventory to or from the mobile robot to a location in the inventory storage and delivery system. The inventory handling system further includes a control system configured to dynamically control the movement of the mobile robot in the x,y,z direction at one or more transfer nodes of the multi-level transport system, by dynamically activating a corresponding magnetic track of the plurality of magnetic tracks or a corresponding transfer mechanism of the plurality of transfer mechanisms.

According to yet another example embodiment, a modular, multi-level material-transport system is presented. The modular-multi-level material transport system includes a plurality of magnetic tracks configured to allow movement of the mobile robot in at least one direction in the xy-plane. The multi-level transport system further includes a plurality of transfer mechanisms configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system. A track of the plurality of magnetic tracks is configured to provide a path for the movement of the mobile robot between two or more transfer mechanisms of the plurality of transfer mechanisms. The modular, multi-level material-transport system further includes a plurality of inventory transfer assemblies coupled to a magnetic track of the plurality of magnetic tracks, the plurality of inventory transfer assemblies configured to transfer inventory to or from the mobile robot to a location in the inventory storage and delivery system. The modular, multi-level material-transport system furthermore includes a power module configured to dynamically power a magnetic track of the plurality of magnetic tracks or a transfer mechanism of plurality of transfer mechanisms.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 1A illustrates a robotic system, according to some aspects of the present description, FIG. 1B is a perspective view of a multi-level transport system, according to some aspects of the present description.

DETAILED DESCRIPTION OF EXAMPLE EMBODIMENTS

Figure 2:
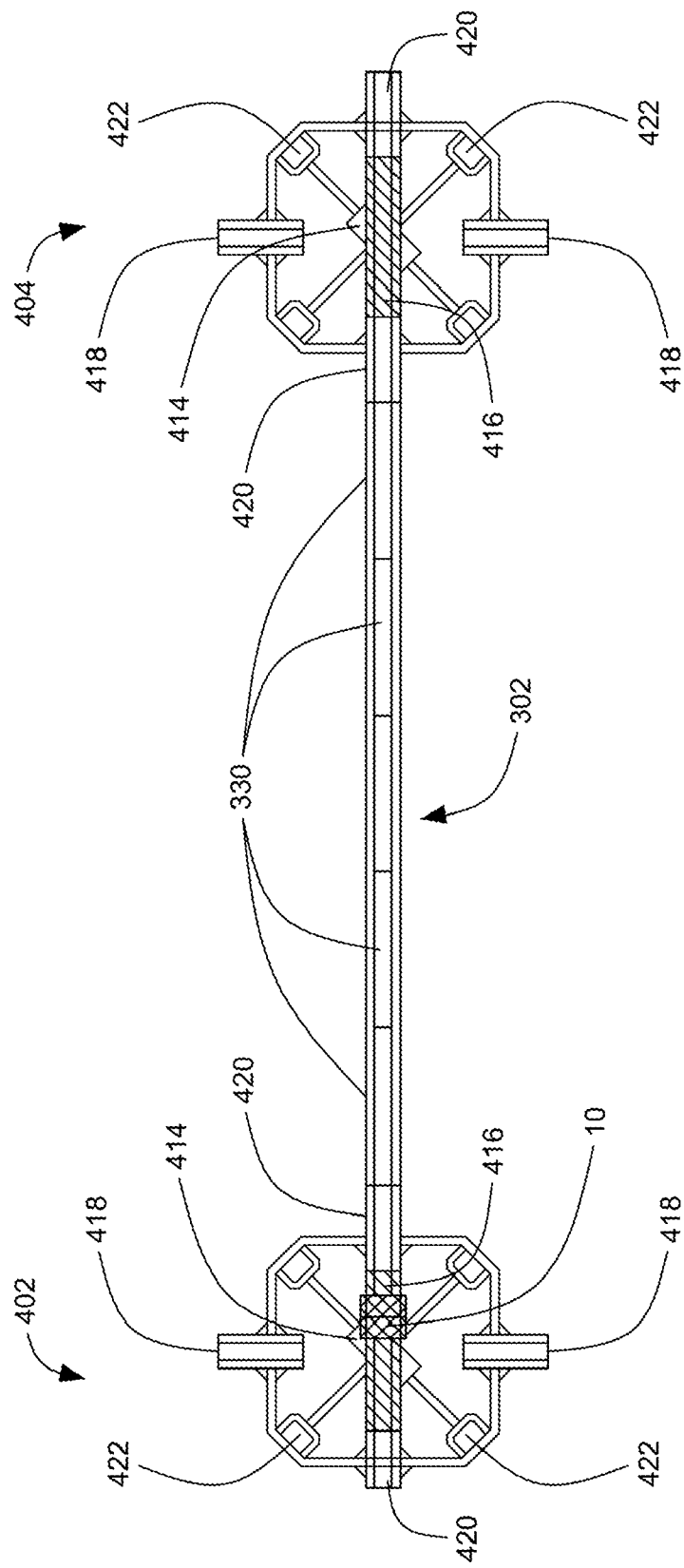
FIG. 2 is top view of a magnetic track coupled to two transfer mechanisms, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Example embodiments of the present description present modular, flexible and scalable robotic systems for dynamically controlling the movement of a mobile robot.

FIG. A illustrates a robotic system 100 in accordance with some embodiments of the present description. The robotic system 100 includes a multi-level transport system 200. The term "multi-level transport system" as used herein refers a transport system that has transport pathways arranged at multiple levels or floors, and which allows for the movement of a mobile robot 10 between the different levels or floors as well as within a particular level or floor. For example, in the embodiment illustrated in FIG. 1A, the multi-level transport system 200 has two levels or floors and allows for the movement of the mobile robot 10 on both the levels. In accordance with embodiments of the present description, the multi-level transport system 200 may include any number of levels ranging from 2 to 100. Further, as shown in FIG. 1A, the multi-level transport system 200 is arranged in the xyz-space.

The multi-level transport system 200 may optionally include an input track 202 and an output track 204, as shown in FIG. 1A. In some embodiments, the input track 202 and the output track 204 may be conveyor systems that allow for the movement of the mobile robot 10 into and out of the multi-level transport system 200. In the embodiment, illustrated in FIG. 1A, the input track 202 and the output track 204 include magnetic tracks. The term "mobile robot" as used herein refers to a robotic device or vehicle that is capable of movement. Further, the term "mobile robot" as used herein encompasses both automatic guided vehicles (AGVs) and autonomous mobile robots (AMRs). In some embodiments, the mobile robot is a material-handling robot, an inspection robot, or a repair robot.

In some embodiments, the mobile robot is a vehicle that provides for movement of material inside the multi-level transport system 200. The mobile robot in some such instances may be further configured to pick up the material e.g., from storage or pick-up locations in a warehouse context or other processing sites in a manufacturing context. In some embodiments, the mobile robot may include—powered rollers e.g., in applications involving individual items rather than cases. In some cases, the mobile robot may further include robotic arms. In some embodiments, the mobile robot may include cross-belts and/or forks for handling totes/cases, e.g., in applications involving where the material needs to be put away. These could be storage/delivery locations or other feeder systems feeding downstream processes/storage.

In some embodiments, the mobile robot is configured for inspection and/or for troubleshooting, e.g., in manufacturing sites. In such instances, the mobile robot may move via the multi-level transport system 200 to the inspection location. In some embodiments, the mobile robot is configured for error recovery, and for rectifying the error before recommencing operation e.g., in manufacturing sites. In such instances, the mobile robot may move via the multi-level transport system 200 to the location reporting an error. In certain embodiments, the mobile robot is configured to provide for the movement of inventory (as individual items, totes, or cases) in the multi-level transport system 200. The mobile robot in some embodiment includes a magnetic portion on at least a portion of its base that allows for the movement of the mobile robot on the magnetic tracks.

The multi-level transport system 200 includes a plurality of magnetic tracks 300 configured to allow movement of the mobile robot 10 in at least one direction in the xy-plane. The plurality of magnetic tracks 300 is arranged in the xy-space at the different levels of the multi-level transport system 200, as shown in FIG. 1A.

FIG. 1B is a perspective view of the multi-level transport system of FIG. 1A that shows the magnetic tracks and the transfer mechanisms in more detail. As shown in FIG. 1B, the magnetic tracks 302, 306, 310 and 314 are present on the first level of the multi-level transport system 200, and allow for movement of the mobile robot 10 in the x-direction. The magnetic tracks 318, 322 and 326 are also present on the first level of the multi-level transport system 200, and allow for movement of the mobile robot 10 in the y-direction. Similarly, the magnetic tracks 304, 308, 312 and 316 are present on the second level of the multi-level transport system 200, and allow for movement of the mobile robot 10 in the x-direction. Further, the magnetic tracks 320, 324 and 328 are also present on the second level of the multi-level transport system 200, and allow for movement of the mobile robot 10 in the y-direction. The number and configuration of the magnetic tracks in the plurality of magnetic tracks 300 may vary depending on the end-use case.

Depending on the orientation of a magnetic track of the plurality of magnetic tracks 300, the magnetic track includes a plurality of electromagnetic motors arranged longitudinally in the x-direction or the y-direction. Non-limiting example of a suitable electromagnetic motor includes a linear motor. In some embodiments, the magnetic track may include a plurality electromagnetic motor blocks arranged longitudinally in the magnetic track. These blocks of electromagnetic motors, arranged longitudinally, act as tracks for mobile robots to travel in forward/backward directions. As described in detail later, these blocks of electromagnetic motors may be dynamically activated and deactivated by a control system to selectively activate and deactivate these blocks. This selective activation of the blocks of electromagnetic motors propels the mobile robots with magnetic bases running on these tracks to move in the direction of activation.

FIG. 2 shows a top view of the magnetic track 302 of FIG. 1B, by way of example. As illustrated in FIG. 2, the magnetic track 302 is mechanically coupled to transfer mechanisms 402 and 404 on the two ends. The magnetic track 302 includes a plurality of electromagnetic motor blocks 330, arranged in the x-direction. Each block of the plurality of electromagnetic motor blocks 330 may be selectively activated by the control system 500 to allow for the movement of the mobile robots in the x-direction (towards both left and right), as described in detail later.

Referring back to FIG. 1B, the multi-level transport system 200 further includes a plurality of transfer mechanisms 400. The plurality of transfer mechanisms 400 is configured to change the direction of the mobile robot 10 in the xy-plane, and to allow the movement of the mobile robot 10 in a direction along the z-axis. Further, each transfer mechanism of the plurality of transfer mechanisms 400 is mechanically coupled to an end of a magnetic track of the plurality of magnetic tracks 300 thereby defining a transfer node in the multi-level transport system 200. The number and configuration of the transfer mechanisms in the plurality of transfer mechanisms 400 may vary depending on the end-use case.

The term "transfer node" as used herein refers to a junction in the multi-level transport system 200, where the mobile robot 10 is transferred to another magnetic track of the multi-level transport system 200. The transfer may take place by allowing the mobile 10 to move in the same direction as the original direction, by changing the direction of the movement of the mobile robot 10, and/or by changing the level of the movement of the mobile robot 10. For example, for a mobile robot 10 moving in the x-direction, at the transfer node, the mobile robot may be transferred to another magnetic track in the x-direction, may be transferred to a magnetic track in the y-direction, or may be may be transferred to another level where it may move in the same direction (i.e., x-direction) or a different direction (e.g., y-direction).

In some embodiments, each transfer mechanism of the plurality of transfer mechanisms 400 is mechanically coupled to two or more magnetic tracks of the plurality of magnetic tracks 300. The magnetic tracks and transfer mechanisms of the present description allow for a modular design and configuration of the multi-level transport system 200, as each module (magnetic track or the transfer mechanism) can be coupled to the other to generate the desired layout in the xyz-space. Further, the transfer mechanisms can be stacked on top of each other to generate the different levels/floors in the multi-level transport system 200.

In the example embodiment illustrated in FIG. 1B, the plurality of transfer mechanisms includes transfer mechanisms 402, 404, 406, 408, 410, and 412 at the first level and 424, 426, 428, 430, 432, and 434 at the second level. The multi-level transport system 200, as shown in FIG. 1, includes transfer nodes 206, 208, 210, 212, 214, and 216 at the first level and transfer nodes 218, 220, 222, 224, 226 and 228 at the second level.

By way of example, the transfer mechanism 404 is mechanically coupled to the magnetic tracks 302, 310 and 326 at the first level (defining transfer node 208) and the transfer mechanism 426 is mechanically coupled to magnetic tracks 304, 312 and 328 at the second level (defining transfer mode 220) Thus, the transfer mechanism 404, at the first level, allows for the transfer of the mobile robot in the x-direction to the magnetic track 302 or 310, and for the transfer of the mobile robot in the y-direction to the magnetic track 326. Further, the transfer mechanism 404 allows for the change in the direction of the mobile robot in the xy-space from the magnetic track 302 to the magnetic track 326, or vice versa. Similarly, the transfer mechanism 404 allows for the change in the direction of the mobile robot in the xy-space from the magnetic track 310 to the magnetic track 326, or vice versa. Furthermore, the transfer mechanism 404, at the first level, also allows for the transfer of the mobile root 10 to the second level, by allowing the movement of the mobile robot 10 in the z-direction. It should be noted, that the movement of the mobile robot in the x, y, z-direction can happen along either direction of the x, y, z axis and is not limited to only one direction. Thus, by way of example, the terms "along the z-axis" and 'along the z-direction" encompass movement of the mobile robot 10 in both upward and downward directions.

Similarly, the transfer mechanism 426, at the second level, allows for the transfer of the mobile robot in the x-direction to the magnetic track 304 or 312, and for the transfer of the mobile robot in the y-direction to the magnetic track 328. Further, the transfer mechanism 426 allows for the change in the direction of the mobile robot in the xy-space from the magnetic track 304 to the magnetic track 328, or vice versa. Similarly, the transfer mechanism 426 allows for the change in the direction of the mobile robot in the xy-space from the magnetic track 312 to the magnetic track 328, or vice versa. Furthermore, the transfer mechanism 426, at the second level, also allows for the transfer of the mobile root 10 to the first level, by allowing the downward movement of the mobile robot 10 in the z-direction.

In some embodiments, a transfer mechanism of the plurality of transfer mechanisms 400 includes a shift mechanism that provides for the change in direction of the mobile robot 10 in the xy-plane. Further, the transfer mechanism of the plurality of transfer mechanisms includes a plurality of lift mechanisms that provide for the movement of the mobile robot in the z-direction (both upward and downward movement)

Referring back to FIG. 2, as mentioned earlier, the magnetic track 302 is mechanically coupled to transfer mechanisms 402 and 404 on the two ends. As shown in FIG. 2, the transfer mechanisms 402 and 404 include a shift mechanism 414, e.g., a rotary shift mechanism. The transfer mechanisms 402 and 404 further include a central magnetic block 416 mechanically coupled to the shift mechanism 414 and configured to move along with the shift mechanism. 414 The transfer mechanisms 402 and 404 further include side magnetic blocks 418, 420 configured to mechanically couple with the central magnetic block 416. Thus, by using the shift mechanism 414, a direction of the mobile robot 10 can be changed by shifting the central magnetic block 416 to couple with the respective side magnetic blocks. For example, in the embodiment illustrated in FIG. 2, in order to change the direction of the movement of the mobile robot from x-axis to y-axis, the central magnetic block 416 will need to uncouple from the side magnetic blocks 420 and couple to the side magnetic blocks 418. The uncoupling and shift are implemented by dynamically activating the shift mechanism 414 by the control system 500, as described in detail later.

The transfer mechanisms 402 and 404 further include four lift mechanisms 422 at the four corners of the transfer mechanisms, as shown in FIG. 2. One or more lift mechanisms 422 at the corners are configured to engage with the mobile robot and provide for the movement of the mobile robot in the z-direction (both upward and downward). The life mechanisms 422 are also dynamically activated by the control system 500, as described in detail later. Non-limiting example of a suitable lift mechanism includes a rack and pinion mechanism.

A magnetic track of the plurality of magnetic tracks 300 is configured to provide a path for the movement of the mobile robot 10 between two or more transfer mechanisms of the plurality of transfer mechanisms 400. The path may be a direct path or an indirect path. In FIG. 1B, the magnetic track 302 provides for a path for the mobile robot 10 directly e.g., between the transfer mechanisms 402 and 404, and the corresponding transfer nodes 206 and 208. Whereas, the magnetic tracks 318. 306 and 326 provide for an indirect path between the transfer mechanisms 402 and 404, as the path is routed through the transfer modes 212 and 214. Similarly, the magnetic tracks 320, 308, and 326 provide for another indirect path between the transfer mechanisms 402 and 404. The choice of the path (direct or indirect) taken by the mobile robot is determined and dynamically controlled by the control system 500.

As shown in FIG. 1A, the robotic system further includes a control system 500. The control system 500 is configured to dynamically control the movement of the mobile robot 10 in the x,y,z direction at one or more transfer nodes of the multi-level transport system 200. The movement of the mobile robot in multi-level transport system 200 is dynamically controlled by the control system 500 by dynamically activating a corresponding magnetic track of the plurality of magnetic tracks 300 or a corresponding transfer mechanism of the plurality of transfer mechanisms 400.

Figure 4:
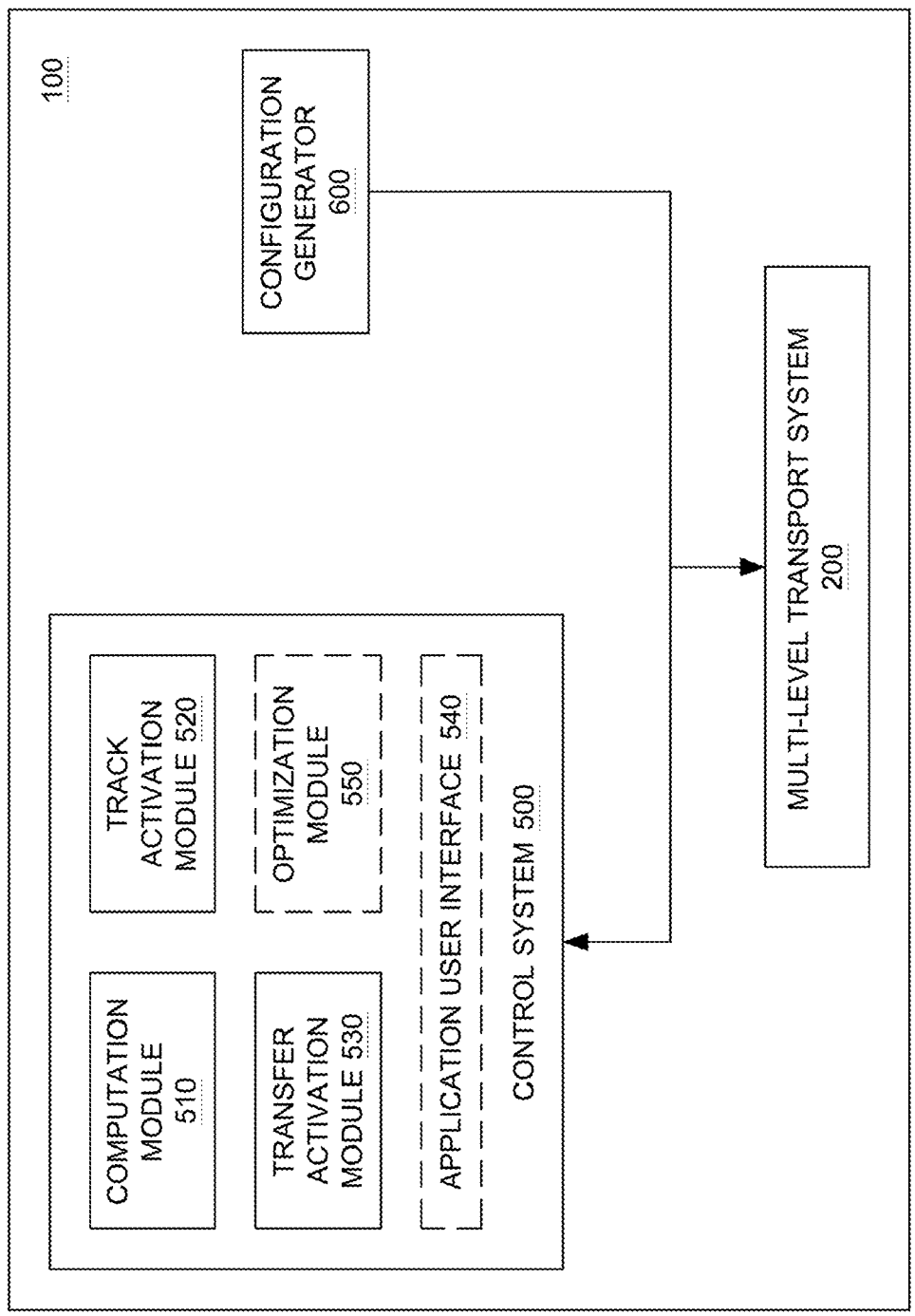
FIG. 4 is a block diagram of a robotic system, according to some aspects of the present description.

The operation of the control system 500 is further described in detail with reference to FIG. 4 that is a block diagram of the robotic system of FIG. 1A. As shown in FIG. 4, the control system includes a computation module 510, a track activation module 520, and a transfer activation module 530. The control system may optionally include an application user interface 540.

The computation module 510 is configured to determine a magnetic track or a transfer mechanism that needs to be activated at a particular instant, and to generate an activation signal. In some embodiments, the computation module 510 is configured to determine the magnetic track or the transfer mechanism that needs to be activated at a particular instant, based on inputs from one or more of motors mechanically coupled to the magnetic tracks or the transfer mechanisms, sensors coupled to the magnetic tracks or the transfer mechanisms, or sensors on the mobile robots themselves.

The computation module 510 is configured to dynamically determine the magnetic track or the transfer mechanism that needs to be activated, thus allowing for dynamic activation of the determined magnetic track or the transfer mechanism and dynamic control of the movement of the mobile robot. The term "dynamic activation" as used herein means that the magnetic track or the transfer mechanism is only activated if the computation module 510 determines that the path of the mobile robot includes that particular magnetic track or the transfer mechanism. The term "dynamic control" as used herein means that the movement of the mobile robot is constantly controlled and changed (if required) in the multi-level transport system 200. This is in contrast to conventional robotic systems where the path of the mobile robot is pre-determined.

The track activation module 520 is configured to activate the determined magnetic track, based on the activation signal from the computation module 510. As noted earlier, the magnetic track includes a plurality of electromagnetic motor blocks. Thus, an activation signal from the track activation module 520 may dynamically and selectively activate a particular electromagnetic motor block of a magnetic track, thereby propelling the movement of the mobile robot along the magnetic track.

Referring back to FIG. 2, for movement of the mobile robot from the transfer mechanism 402 to the transfer mechanism 404, the electromagnetic motor block 330 closest to the transfer mechanism 402 may be first activated such that the mobile robot 10 is transferred from the transfer mechanism 402 to the magnetic track 302. Furthermore, as the mobile robot 10 moves along the x-axis from left to right, the electromagnetic motor blocks 330 may be selectively activated to propel the movement of the mobile robot 10 along the x-direction until it reaches the transfer mechanism 404.

The selective and localized activation of the electromagnetic motors may also help in reducing the energy requirements as only the motors corresponding to the block of the magnetic track being used would need to be powered in accordance with embodiments of the present description. This is in contrast to conventional conveyor-based systems where the conveyors are continuously powered.

Referring again to FIG. 4, the transfer activation module 530 is configured to activate the determined transfer mechanism, based on the activation signal from the computation module 510. The transfer activation module 530 is configured to activate the determined transfer mechanism to allow movement of the mobile robot 10 in the z-direction, based on the activation signal from the computation module 510. The transfer activation module 530 is further configured to activate the determined transfer mechanism to change the direction of the mobile robot 10 in the xy-plane, based on the activation signal from the computation module 510

As noted earlier, a transfer mechanism includes a shift mechanism and four lift mechanisms. Thus, an activation signal from the transfer activation module 530 may dynamically and selectively activate a particular shift mechanism thereby changing the direction of the mobile robot and/or activate the lift mechanisms thereby allowing the mobile robot to move in the z-direction. Referring back to FIG. 2, as the mobile robot 10 nears the transfer mechanism 404, the computation module 510 may determine the direction of transfer for the mobile robot 10 at the transfer node defined by the transfer mechanism 404. If the computation module 410 determines that the path for the mobile robot 10 continues in the x-direction, then the transfer activation module 530 is configured to send a signal to activate the central magnetic block 416 and the side activation blocks 420 such that the mobile robot is allowed to move in the x-direction and transferred to the next magnetic track (i.e., track 310 as shown in FIG. 1B).

However, if the computation module 510 determines that the path for the mobile robot 10 shifts in the y-direction, then the transfer activation module 530 is configured to send a signal to activate the shift mechanism 414, the central magnetic block 416 and the side activation block 418, such that the central magnetic block 416 rotates and couples with the side activation block 418. Thus, the direction of the movement of the mobile robot 10 is changed to the y-direction, and the mobile robot 10 is transferred to the next magnetic track (i.e., track 326 as shown in FIG. 1B). Similarly, if the computation module 410 determines that the path for the mobile robot 10 shifts in the z-direction, then the transfer activation module 530 is configured to send a signal to activate one or more lift mechanisms 422, such that the mobile robot 10 is lifted in the z-direction to next level.

Therefore, the robotic system 100, in accordance with embodiments of the present description, provides for dynamic mapping of the process path as well as dynamic control of the movement of the mobile robot. The dynamic mapping of the process path and the dynamic control of the movement of the mobile robot enable a high degree of operational flexibility, as well as flexibility to have different workflows based on the items being handled.

Referring again to FIG. 4, the control system 500 may optionally include an optimization module 550. An optimization module may further improve speed and performance of the multi-level transport system 200. The optimization module 550 is configured to generate a sequence of magnetic tracks and transfer mechanisms that need to be activated for movement of the mobile robot 10 between two transfer nodes in a shortest duration of time. In such instances, the track activation module 520 and the transfer activation module 530 are further configured to activate the corresponding magnetic tracks and the corresponding transfer mechanisms, based on the sequence generated by the optimization module 550. In some embodiments, the optimization module 540 is configured to optimize the path of the mobile robot 10 at each transfer node in the multi-level transport system 200. The optimization module 550 may be further configured to compare and select the shortest path based on the path distance and journey time from source to destination, based on the current loading pattern along the path.

Figure 5:
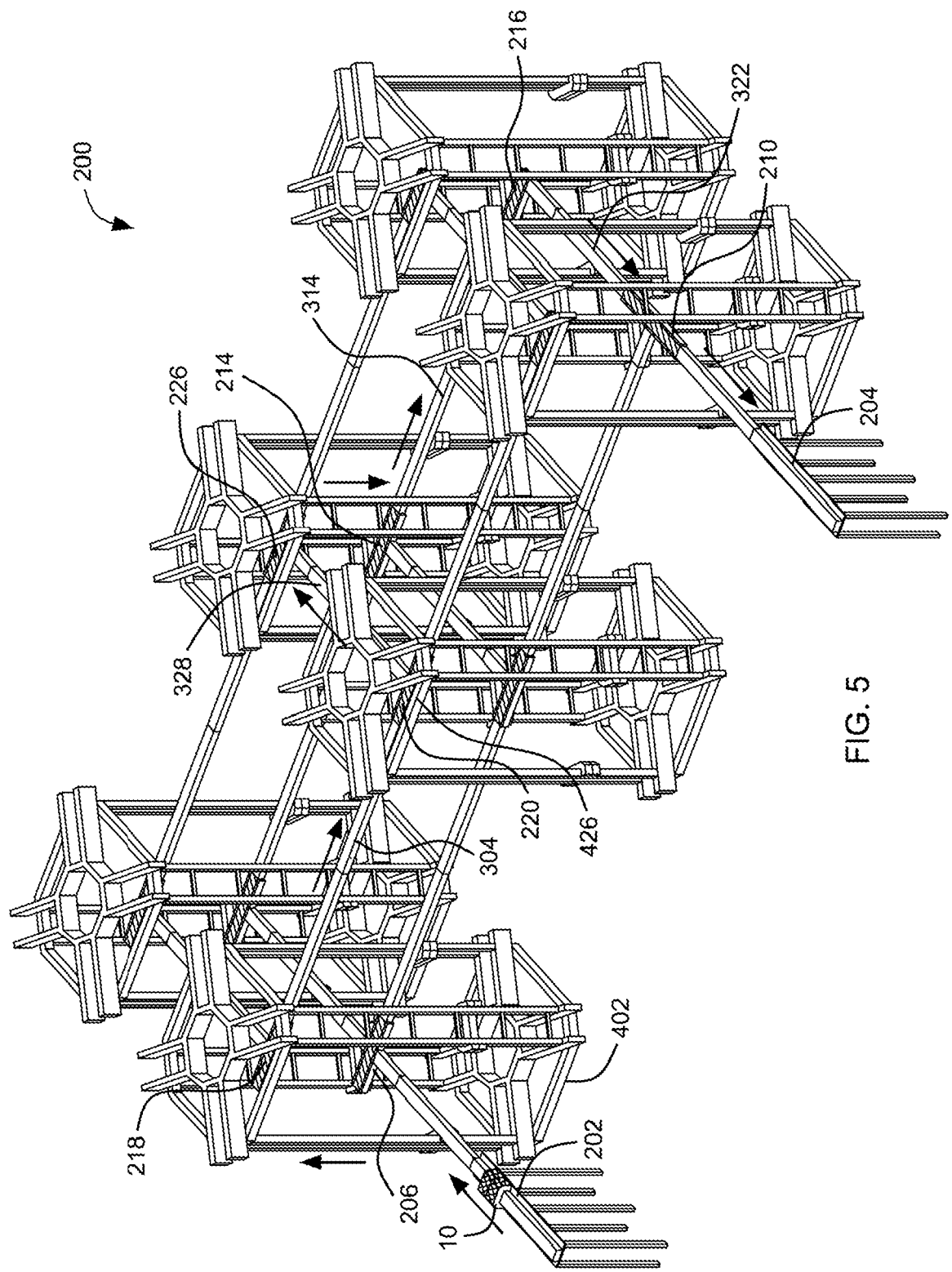
FIG. 5 illustrates a robotic system, according to some aspects of the present description.

FIG. 5 illustrates an example path (shown by arrows) that can be taken by the mobile robot 10 in the multi-level transport system 200. As mentioned earlier, in accordance with certain embodiments of the present description, the path taken by the mobile robot 10 is not pre-determined and is instead dynamically determined and controlled by the control system 500 at each transfer node of the multi-level transport system 200. The computation module 510 of the control module 500 determines, at each transfer node, the path to be taken an also the corresponding magnetic track and/or transfer mechanism that needs to be activated. In some embodiments, the optimization module 550 in conjunction with the computation module 510 may determine the path to be taken between two transfer nodes.

Figure 3:
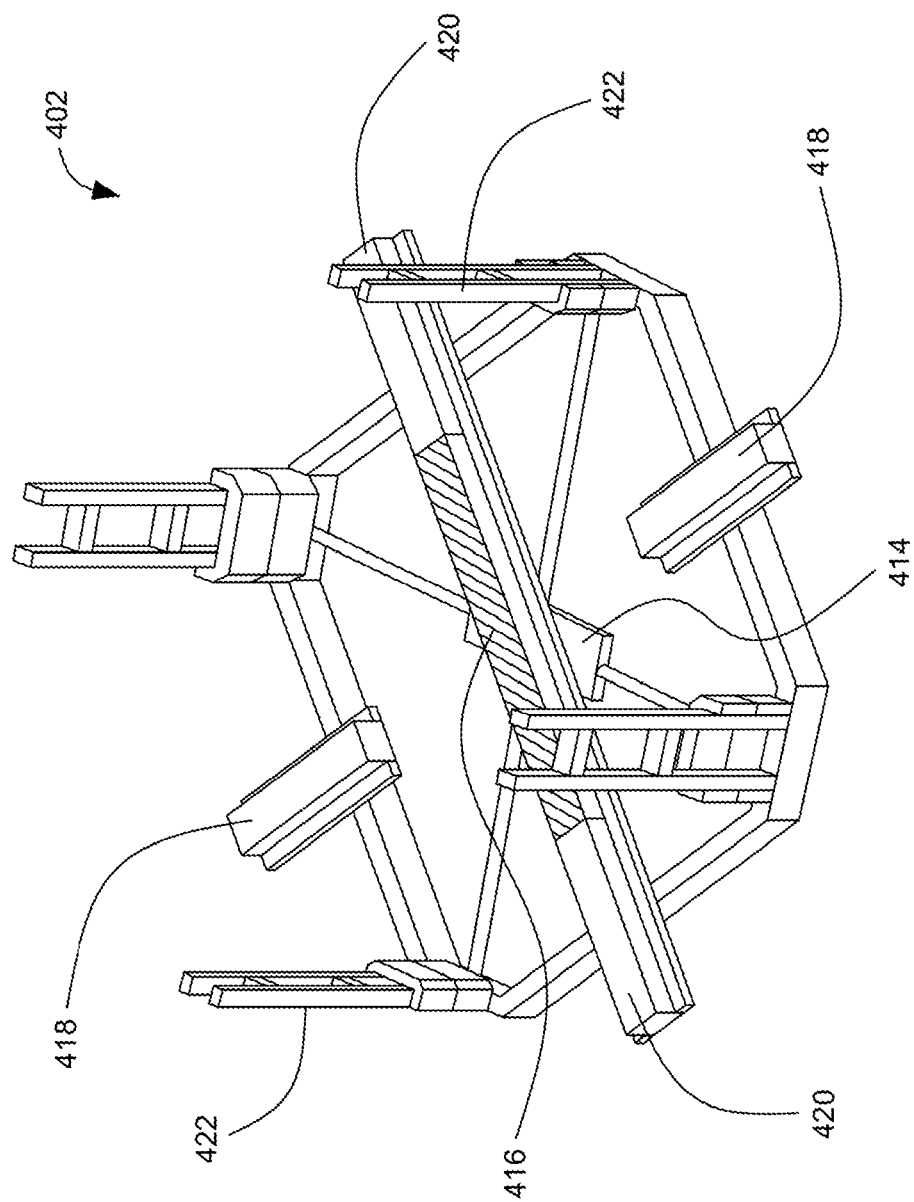
FIG. 3 illustrates a transfer mechanism, according to some aspects of the present description.

In the example embodiment illustrated in FIG. 5, the computation module 510 determines that the mobile robot 10 needs to be move to the second level at the transfer node 206, which in turn means that the transfer mechanism 401 needs to be activated at the first level. In such instances, the computation module 510 sends an activation signal to the transfer activation module 530, which in turn activates the transfer mechanism 401. As noted previously with references to FIGS. 2 and 3, in such instances, one or more lift mechanisms 422 at the corners of the transfer mechanism 402 are activated such that mobile robot 10 moves to the second level to the transfer node 218 and the transfer mechanism 424. In FIG. 5, the computation module 510 further determines that, at the transfer node 218, the mobile robot need to move in the x-direction along the track 304, and sends an activation signal to the track activation module 520. On receiving the activation signal, the track activation module 520 activates the transfer mechanism 424 and the electromagnetic motor blocks 330 of the magnetic track 304 sequentially such that the mobile robot 10 is propelled forward along the track 304.

At the transfer node 220 of the transfer mechanism 426, the computation module 510 determines that the mobile robot 10 needs to change its movement of direction to y-axis towards the magnetic track 328. In such instances, the computation module 510 sends an activation signal to the transfer activation module 530, which in turn activates the transfer mechanism 426. As noted previously with references to FIGS. 2 and 3, in such instances, the shift mechanism 414 of the transfer mechanism 426 is activated such that movement of the mobile robot 10 is shifted in the y-direction towards the magnetic track 328 and the transfer node 226. The mobile robot 10, as shown in FIG. 5, continues moving from transfer node 226 to its end destination via transfer nodes 214, 216 and 210. At each of these transfer nodes, the control system 500 dynamically controls the movement of the mobile robot 10 by dynamically activating the corresponding transfer mechanisms and/or magnetic tracks as described herein earlier.

Figure 6:
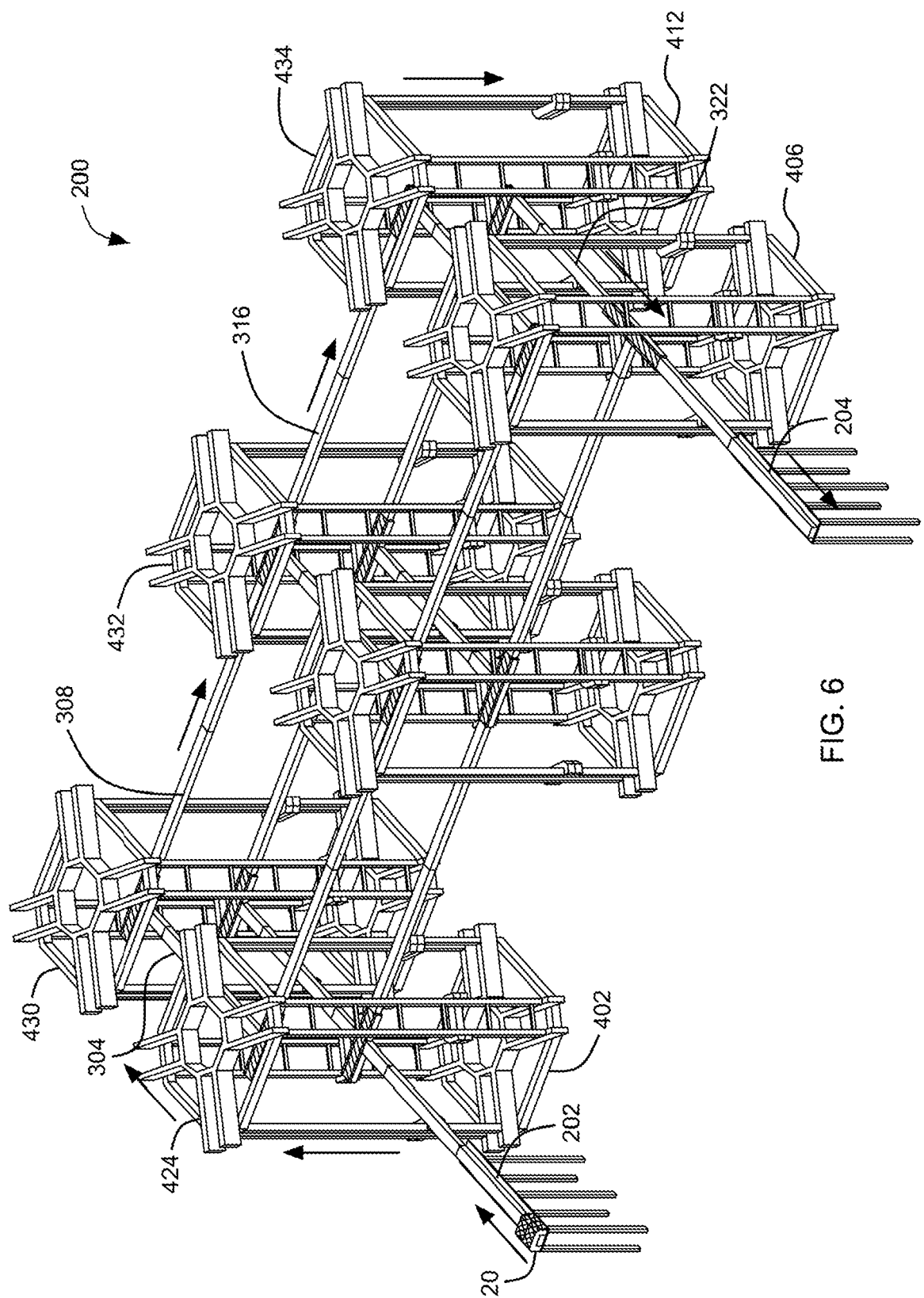
FIG. 6 illustrates a robotic system, according to some aspects of the present description.

The robotic system 100, as described herein, may provide for dynamically controlling the movement of a plurality of mobile robots. The mobile robots of the plurality of robots may follow the same path or a different path. The path of each mobile robot is dynamically controlled by the control system 500. FIG. 6 illustrates an example path (shown by arrows) that can be taken by the mobile robot 20 in the multi-level transport system 200. As shown in FIG. 6, the path taken by the mobile robot 20 is partially different from the path taken by the mobile robot 10 in FIG. 5. Similar to FIG. 5, at each of the transfer nodes in the path of the mobile robot 20, the control system 500 dynamically controls the movement of the mobile robot 20 by dynamically activating the corresponding transfer mechanisms and/or magnetic tracks.

The robotic system 100 may further optionally include a configuration generator 600, as shown in FIG. 4. The configuration generator 600 is configured to generate number of levels in the multi-level transport system, number of magnetic tracks in the multi-level transport system, number of transfer mechanisms in the multi-level transport system, and a design configuration of the plurality of magnetic tracks and the transfer mechanisms in the multi-level transport system, based on inputs for a particular use-case. Non-limiting examples of suitable inputs include, throughput, size of items of being handled, floor area available, and the like. The configurator generator 600 may further provide information on the footprint of the solution, throughput simulation, and CAD model of the full multi-level transport system 200.

The robotic system 100 in accordance with embodiments of the present description is scalable, i.e., capable of changing its size and scale depending on the use-case requirement. In some embodiments, the multi-level transport system 200 is further configured to be extendable in at least one direction in the xyz space by adding one or more magnetic tracks and one or more transfer mechanisms. The magnetic tracks and the transfer mechanisms can be easily added to the existing multi-level transport system 200 because of the modular design of the system, as described herein earlier.

In addition, in such instances, the control system 500 is further configured to dynamically control the movement of the mobile robot in the added magnetic tracks and the added transfer mechanisms, thereby providing both flexibility and scalability to the robotic system 100. In some embodiments, the optimization module 550 of the control system 500, as shown in FIG. 4 may be further configured to optimize the path of the mobile robot across the added magnetic tracks and the added transfer mechanisms. Furthermore, in some embodiments, the number and the design configuration of the added magnetic tracks and the transfer mechanisms may be determined by the configuration generator 600 of FIG. 4.

The robotic system 100, as described herein, may be implemented in any site/location that requires automated system for material handling, inspection, and/or error recovery. In some embodiments, the robotic system 100 may be implemented in storage sites, delivery sites, manufacturing sites, and the like.

In certain embodiments, the robotic system 100 is an inventory handling system 100 in an inventory storage and delivery system (e.g., a warehouse). The inventory handling system 100 is configured to dynamically control the movement of inventory via a mobile robot 10. The inventory handling system 100 includes a multi-level transport system 200 arranged in an xyz space, as shown earlier in FIG. 1A.

The multi-level transport system 200 includes a plurality of magnetic tracks 300 configured to allow movement of the mobile robot in at least one direction in the xy-plane. The multi-level transport system 200 further includes a plurality of transfer mechanisms 400 configured to change the direction of the mobile robot in the xy-plane, and to allow the movement of the mobile robot in a direction along the z-axis, each transfer mechanism of the plurality of transfer mechanisms 400 mechanically coupled to an end of a magnetic track of the plurality of magnetic tracks thereby defining a transfer node in the multi-level transport system. The plurality of magnetic tracks 300 is configured to provide a path for the movement of the mobile robot between two or more transfer mechanisms of the plurality of transfer mechanisms 400. The configuration and operation of the magnetic tracks 300 and the transfer mechanisms 400 has been described earlier.

Figure 7:
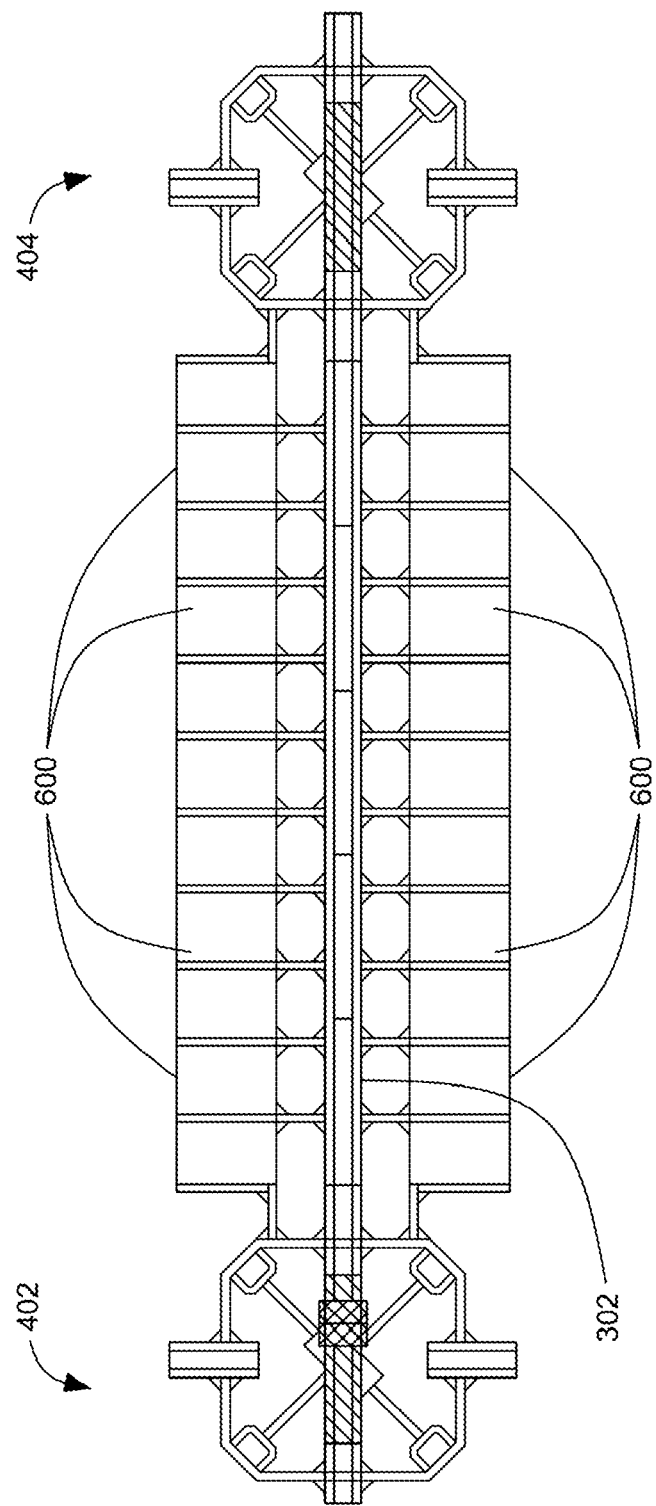
FIG. 7 is top view of a magnetic track coupled to two transfer mechanisms and a plurality of inventory transfer assemblies, according to some aspects of the present description.

The multi-level transport system 200 in such embodiments further includes a plurality of inventory transfer assemblies coupled to a magnetic track of the plurality of magnetic tracks. The plurality of inventory transfer assemblies is configured to transfer inventory to or from the mobile robot to a location in the inventory storage and delivery system. FIG. 7 shows an example embodiment where the plurality of transfer assemblies 600 is coupled to the magnetic track 302. In some embodiment, the plurality of transfer assemblies may include conveyor belts, that allow for movement of the inventory (as individual items, totes, cases etc.) from the mobile robot to the corresponding storage or delivery location. In some embodiment, the plurality of transfer assemblies may include conveyor belts, that allow for movement of the inventory (as individual items, totes, cases etc.) from a storage location to the mobile robot.

Figure 8:
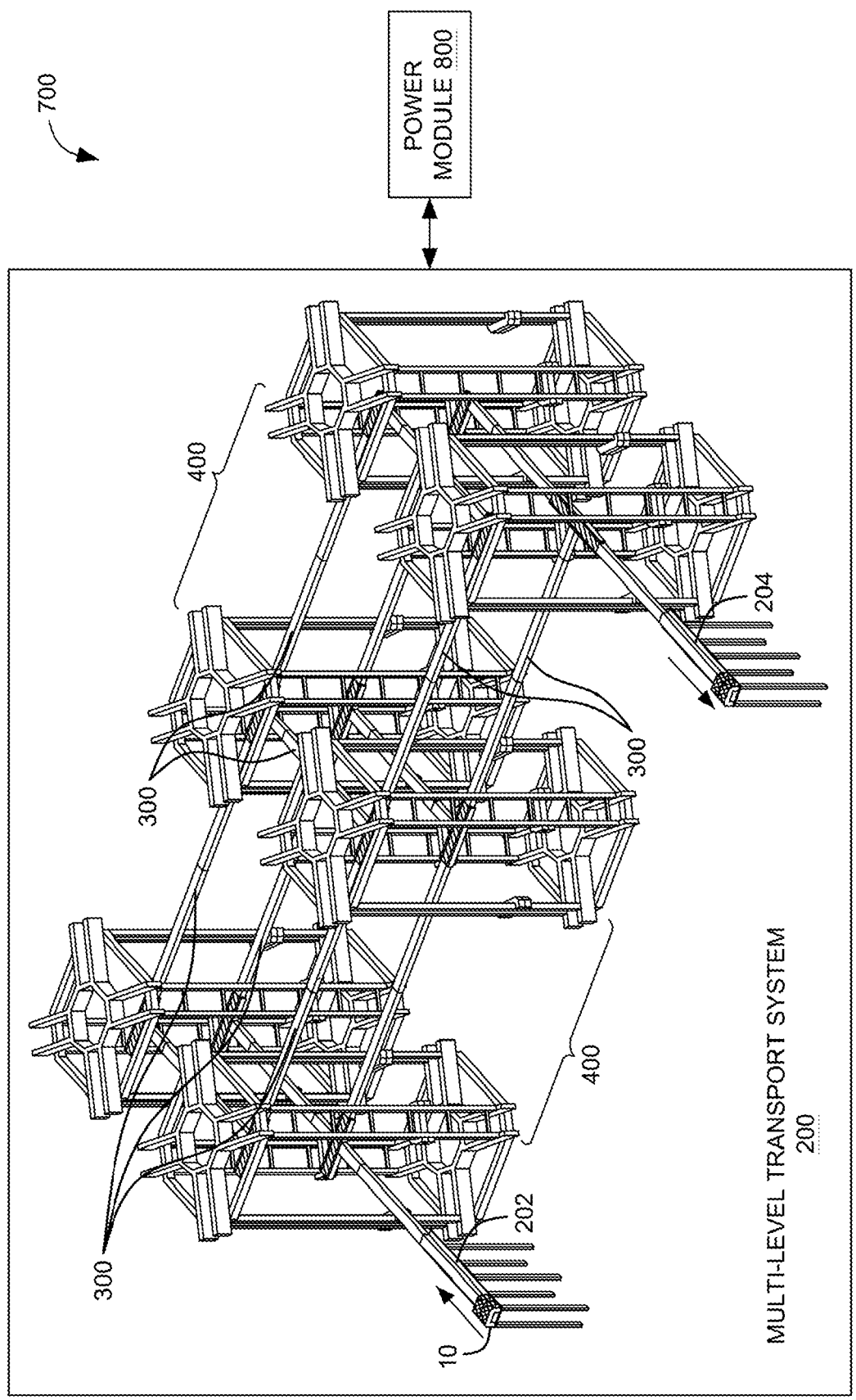
FIG. 8 illustrates a modular, multi-level transport system, according to some aspects of the present description.

The inventory handling system 100 further includes a control system 500 configured to dynamically control the movement of the mobile robot 10 in the x,y,z direction at one or more transfer nodes of the multi-level transport system 200, by dynamically activating a corresponding magnetic track or a corresponding transfer mechanism. The configuration and operation of the control system 500 has been described earlier. The control system 500 may be configured to execute a storage algorithm and a pick-up algorithm. The control system 500 may be further configured to align the inventories to the storage algorithm, apply the pick-up algorithm, as specified by a user during actual delivery, and present the picked-up inventories to multiple operators through a recirculation FIG. 8 illustrates a modular, multi-level material-transport system 700. The multi-level material transport system 700 includes a plurality of magnetic tracks 300 configured to allow movement of the mobile robot in at least one direction in the xy-plane. The multi-level transport system 200 further includes a plurality of transfer mechanisms 400 configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system. The plurality of magnetic tracks 300 is configured to provide a path for the movement of the mobile robot between two or more transfer mechanisms of the plurality of transfer mechanisms 400. The configuration and operation of the magnetic tracks 300 and the transfer mechanisms 400 has been described earlier.

The multi-level transport system further includes a power module 800 configured to dynamically power a magnetic track of the plurality of magnetic tracks or a transfer mechanism of the plurality of transfer mechanisms, as shown in FIG. 8. The power module 800 may be capable of individually powering the magnetic tracks or the transfer mechanism e.g., by using individual power banks. Or, alternately, the power module 800 may be capable of centrally powering the magnetic tracks or the transfer mechanisms.

The robotic systems in accordance with embodiments of the present description provide for flexible, scalable and modular systems. The dynamic mapping of the process path and the dynamic control of the movement of the mobile robot enable a high degree of operational flexibility, as well as flexibility to have different workflows based on the items being handled. Moreover, as the multi-level transport system provides for flexibility of the mobile robot that can be employed, the robotic systems allow for storage, retrieval and handling of a variety of items of different sizes, shapes and weights. Furthermore, the magnetic tracks and transfer mechanisms of the present description allow for a modular design and configuration of the multi-level transport system, as each module (magnetic track or the transfer mechanism) can be easily coupled to the other to generate the desired layout in the xyz-space. The modular design of the multi-level transport system along with the control system capability also make the robotic systems of the present description easily scalable, i.e., capable of changing its size and scale depending on the use-case requirement.

The robotic systems in accordance with embodiments of the present description may also provide for high throughput systems, with low floor space and energy requirements. High throughputs may be possible as the electromagnetic propulsion allows for very fast movement of vehicles on the tracks while reducing wastage due to friction. Further, by optimizing the path of the multiple robots, more movement can be achieved in the same amount of time. Moreover, the robotic systems allow for movement on the z-plane along with the movement on the xy-plane, in contrast to traditional material handling systems. Utilization of the space in the z-plane also reduces the floor space requirement. Furthermore, as the magnetic tracks employed in the robotic systems can be selectively and locally activated, the energy consumption can be reduced significantly as compared to conventional conveyor-based systems that require constant energy input. In addition, non-value-added dead travel can be minimized in the robotic systems according to embodiments of the present description. In some embodiments, the energy consumption of the robotic systems accordance with embodiments of the present description is at least 20% more efficient when compared to a conventional conveyor-based system, while handling the same throughput.

The control system(s), described herein, may be realized by hardware elements, software elements and/or combinations thereof. For example, the modules and components illustrated in the example embodiments may be implemented in one or more general-use computers or special-purpose computers, such as a processor, a controller, an arithmetic logic unit (ALU), a digital signal processor, a microcomputer, a field programmable array (FPA), a programmable logic controller (PLC), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

While only certain features of several embodiments have been illustrated, and described herein, many modifications and changes will occur to those skilled in the art. It is, therefore, to be understood that the appended claims are intended to cover all such modifications and changes as fall within the scope of the invention and the appended claims.

The invention claimed is:

1. A robotic system for dynamic controlling the movement of a mobile robot, comprising:
   a multi-level transport system arranged in an xyz-space, comprising:
       a plurality of magnetic tracks configured to allow movement of the mobile robot in at least one direction in the xy-plane, and
       plurality of transfer mechanisms configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system,
       wherein the plurality of magnetic tracks is configured to provide a path for the movement of the mobile robot between two or more transfer mechanisms of the plurality of transfer mechanisms; and
   a control system configured to dynamically control the movement of the mobile robot in the x,y,z direction at one or more transfer nodes of the multi-level transport system, by dynamically activating a corresponding magnetic track of the plurality of magnetic tracks or a corresponding transfer mechanism of the plurality of transfer mechanisms.

2. The robotic system of claim 1, wherein the control system comprises:
   a computation module configured to determine a magnetic track or a transfer mechanism that needs to be activated at a particular instant, and to generate an activation signal;
   a track activation module configured to activate the determined magnetic track, based on the activation signal from the computation module; and
   a transfer activation module configured to activate the determined transfer mechanism, based on the activation signal from the computation module.

3. The robotic system of claim 2, wherein the transfer activation module is further configured to activate the determined transfer mechanism to allow movement of the mobile robot in the z-direction, based on the activation signal from the computation module.

4. The robotic system of claim 2, wherein the transfer activation module is further configured to activate the determined transfer mechanism to change the direction of the mobile robot in the xy-plane, based on the activation signal from the computation module.

5. The robotic system of claim 2, wherein the computation module is configured to determine the magnetic track or the transfer mechanism that needs to be activated at a particular instant, based on inputs from one or more of motors mechanically coupled to the magnetic tracks or the transfer mechanisms, sensors coupled to the magnetic tracks or the transfer mechanisms, or the mobile robots.

6. The robotic system of claim 2, wherein the control system further comprises an optimization module configured to generate a sequence of magnetic tracks and transfer mechanisms that need to be activated for movement of the mobile robot between two transfer nodes in a shortest duration of time, and wherein the track activation module and the transfer activation module are configured to activate the corresponding magnetic tracks and the corresponding transfer mechanisms, based on the sequence generated by the optimization module.

7. The robotic system of claim 1, further comprising a configuration generator configured to generate number of levels in the multi-level transport system, number of magnetic tracks in the multi-level transport system, number of transfer mechanisms in the multi-level transport system, and a design configuration of the plurality of magnetic tracks and the transfer mechanisms in the multi-level transport system, based on inputs for a particular use-case.

8. The robotic system of claim 1, wherein the multi-level transport system is further configured to be extendable in at least one direction in the xyz space by adding one or more magnetic tracks and one or more transfer mechanisms, and wherein the control system is further configured to dynamically control the movement of the mobile robot in the added magnetic tracks and the added transfer mechanisms.

9. The robotic system of claim 1, wherein the mobile robot is a material-handling robot, an inspection robot, or a repair robot.

10. The robotic system of claim 1, wherein the multi-level transport system further comprises a plurality of material transfer assemblies coupled to a magnetic track of the plurality of magnetic tracks, the plurality of material transfer assemblies configured to transfer material to or from the mobile robot to a storage location.

11. An inventory-handling system for dynamically controlling the movement of inventory via a mobile robot in an inventory storage and delivery system, comprising:
   a multi-level transport system arranged in an xyz-space, comprising:
      a plurality of magnetic tracks configured to allow movement of the mobile robot in at least one direction in the xy-plane,
      a plurality of transfer mechanisms configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system,
      wherein the plurality of magnetic tracks is configured to provide a path for the movement of the mobile robot between two or more transfer mechanisms of the plurality of transfer mechanisms, and
      a plurality of inventory transfer assemblies coupled to a magnetic track of the plurality of magnetic tracks, the plurality of inventory transfer assemblies configured to transfer inventory to or from the mobile robot to a location in the inventory storage and delivery system; and
   a control system configured to dynamically control the movement of the mobile robot in the x,y,z direction at one or more transfer nodes of the multi-level transport system, by dynamically activating a corresponding magnetic track of the plurality of magnetic tracks or a corresponding transfer mechanism of the plurality of transfer mechanisms.

12. The inventory-handling system of claim 11, wherein the control system comprises:
   a computation module configured to determine a magnetic track or a transfer mechanism that needs to be activated at a particular instant, and to generate an activation signal;
   a track activation module configured to activate the determined magnetic track, based on the activation signal from the computation module; and
   a transfer activation module configured to activate the determined transfer mechanism, based on the activation signal from the computation module.

13. The inventory-handling system of claim 12, wherein the transfer activation module is further configured to activate the determined transfer mechanism to allow movement of the mobile robot in the z-direction, based on the activation signal from the computation module.

14. The inventory-handling system of claim 12, wherein the transfer activation module is further configured to activate the determined transfer mechanism to change the direction of the mobile robot in the xy-plane, based on the activation signal from the computation module.

15. The inventory-handling system of claim 12, wherein the control system further comprises an optimization module configured to generate a sequence of magnetic tracks and transfer mechanisms that need to be activated for movement of the mobile robot between two transfer nodes in a shortest duration of time, and wherein the track activation module and the transfer activation module are configured to activate the corresponding magnetic tracks and the transfer mechanisms, based on the sequence generated by the optimization module.

16. The inventory-handling system of claim 11, wherein the multi-level transport system is further configured to be extendable in at least one direction in the xyz space by adding one or more magnetic tracks and one or more transfer mechanisms, and wherein the control system is further configured to dynamically control the movement of the mobile robot in the added magnetic tracks and the added transfer mechanisms.

17. A modular, multi-level material-transport system, comprising:
   a plurality of magnetic tracks configured to allow movement of the mobile robot in at least one direction in the xy-plane;
   a plurality of transfer mechanisms configured to change the direction of the mobile robot in the xy-plane, and to allow the movement of the mobile robot in a direction along the z-axis, each transfer mechanism of the plurality of transfer mechanisms mechanically coupled to an end of a magnetic track of the plurality of magnetic tracks thereby defining a transfer node in the multi-level transport system, wherein the plurality of magnetic tracks is configured to provide a path for the movement of the mobile robot between two or more transfer mechanisms of the plurality of transfer mechanisms; and a power module configured to dynamically power a magnetic track of the plurality of magnetic tracks or a transfer mechanism of plurality of transfer mechanisms.

18. The modular, multi-level material-transport system of claim 17, wherein a magnetic track of the plurality of magnetic tracks comprises a plurality of electromagnetic motors arranged in the x-direction or the y-direction.

19. The modular, multi-level material-transport system claim 17, wherein a transfer mechanism of the plurality of transfer mechanisms comprises a rotary shift mechanism that allows for changing the direction of the mobile robot in the xy-plane.

20. The modular, multi-level material-transport system claim 17, wherein a transfer mechanism of the plurality of transfer mechanisms comprises a rack and pinion-based mechanism that allows the movement of the mobile robot in the z-direction.

* * * * *